United States Patent [19]

Huang

[11] Patent Number: 5,169,117
[45] Date of Patent: Dec. 8, 1992

[54] LOW POWER TYPE, MOTOR-CONTROLLED MAGNETIC VALVE

[76] Inventor: Chi-King Huang, Rm. 405, 4F., No. 96, Sec. 2, Chungshan N. Rd., Taipei, Taiwan

[21] Appl. No.: 842,539

[22] Filed: Feb. 27, 1992

[51] Int. Cl.⁵ .............................................. F16K 31/40
[52] U.S. Cl. ............................. 251/30.03; 251/30.01; 251/38; 251/45; 251/65
[58] Field of Search .................... 251/65, 30.03, 30.01, 251/38, 45

[56] References Cited

U.S. PATENT DOCUMENTS 3,376,013 4/1968 Mallett .............................. 251/65 X
4,819,682 4/1989 Van Marcke ...................... 251/65 X Primary Examiner—Arnold Rosenthal
Attorney, Agent, or Firm—Varndell Legal Group

[57] ABSTRACT

A lower power type, motor-controlled magnetic valve comprising a reversible motor, a speed reducing gear controlled by said reversible motor to move an external magnetic set into a first position in attracting an internal magnetic set or a second position in repulsing said internal magnetic set, causing a plunger to leave from or press against a valve flap, permitting said valve flap to open or close a discharging pipe.

14 Claims, 6 Drawing Sheets

LOW POWER TYPE, MOTOR-CONTROLLED MAGNETIC VALVE

BACKGROUND OF THE INVENTION

The present invention relates to valves. More particularly, the present invention relates to a low power type, motor-controlled magnetic valve used in controlling the gate of a water discharging pipe.

A solenoid valve is generally comprised of a solenoid coil triggered to produce a magnetic force for attracting a metal plunger or valve stem so that a valve gate can be controlled. FIGS. 1 and 2 illustrate solenoid valve used in controlling the gate of a water discharging pipe. In this structure of solenoid valve, a solenoid coil is mounted around a cylinder, and a spring is fastened inside the cylinder and stopped against a metal plunger. When electric power is connected, the solenoid valve produces a magnetic force in attract the metal plunger causing it to leave from a valve flap (See FIG. 1). When the pressure from the metal plunger is released from the valve flap, the valve flap is forced by the working fluid from a water intake pipe to open a discharging pipe, permitting the working fluid to discharge therethrough. When electric power is disconnected, the spring automatically moves the plunger back to its original position in pressing against the valve flap causing it to close the discharging pipe again. However, this solenoid valve is still not satisfactory in use. One disadvantage of this structure of solenoid valve is its high consumption of load power. Because the spring provides a force to constantly push the metal plunger downwards, the magnetic force from the solenoid coil must be strong enough to surpass the resisting force from the sping, and therefore, the required power voltage is high. Another disadvantage of this structure of solenoid valve is that the working fluid which enters the cylinder gives a resisting force to the plunger causing the solenoid coil to take longer time in attracting the metal plunger, and therefore, electric power consumption is relatively increased.

SUMMARY OF THE INVENTION

The present invention has been accomplished to eliminate the aforesaid problems. It is therefore an object of the present invention to provide a low power type, motor-controlled magnetic valve for controlling the gap of a discharging pipe, which utilizes less electric power. It is another object of the present invention to provide a low power type, motor-controlled magnetic valve which utilizes permanent magnets to control the position of a plunger, by means of magnetic attraction or repulsion, so as to close or open the gate of a discharging pipe.

According to the present invention, a low power type, motor-controlled magnetic valve is generally comprised of a reversible motor and a speed reducing gear. The speed reducing gear is controlled by the reversible motor to move an external magnetic set into a first position in attracting an internal magnetic set or a second position in repulsing said internal magnetic set, causing a plunger to leave from or press against a valve flap, permitting said valve flap to open or close a discharging pipe. In a first embodiment of the present invention, the speed reducing gear is comprised a worm meshed with a slide block and controlled by a reversible motor to rotate forwards or backwards. Rotating the reversible motor causes the slide block to move forwards or backwards, causing a first permanent magnet of the external magnet set to attract the internal magnet set or a second permanent magnet of the external magnet set to repulse the internal magnet set. The internal magnet set is attached to the plunger at a top edge thereof. When the internal magnet set is attracted by the first permanent magnet, the plunger is moved away from the valve flap causing the discharging pipe to be opened; when the internal magnet set is repulsed by the second permanent magnet, the plunger is moved to press on the valve flap causing the discharging pipe to be closed again. In an alternate form of the speed reducing gear, a sector gear is used to replace the slide block. In a second embodiment, two meshed gears are controlled by a reversible motor to rotate a swinging block, permitting an external magnet to be moved into a top or a bottom position. When the external magnet is moved into the top position, the metal body of the swinging block causes the plunger to be lifted from the valve flap, by means of the effect of a magnetic attraction between the metal body and a permanent magnet on the plunger, permitting the discharging pipe to be opened. When the external magnet is moved into the bottom position, it immediately repulses the permanent magnet on the plunger causing the plunger to press against the valve flap, and therefore, the discharging pipe is closed again.

DETAILED DESCRIPTION OF THE PREFERRED EMBODIMENTS

Figure 2:
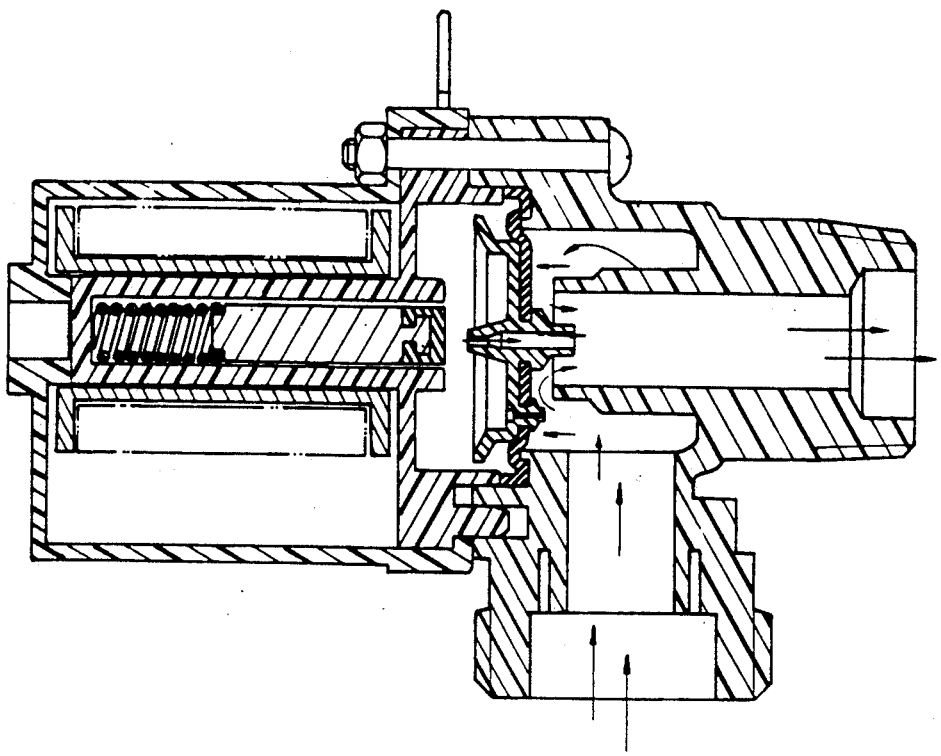
FIG. 2 is another sectional view of the solenoid valve of FIG. 1, showing that the plunger has been pushed back by the spring thereof.
Figure 1:
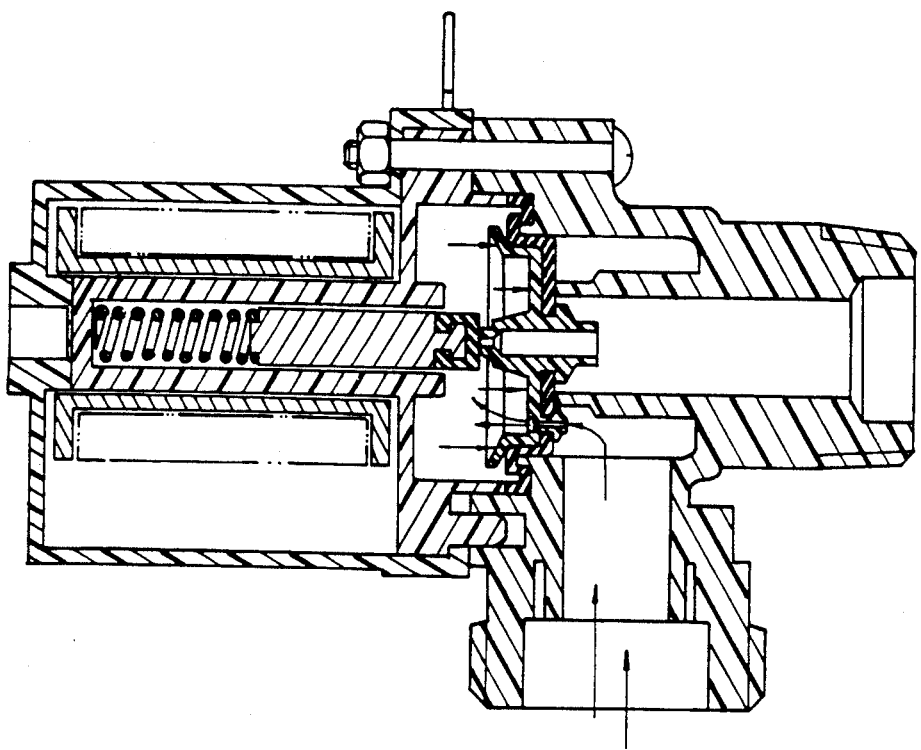
FIG. 1 is a sectional view of a solenoid valve according to the prior art, showing that the plunger has been attracted by the solenoid coil thereof.
Figure 3:
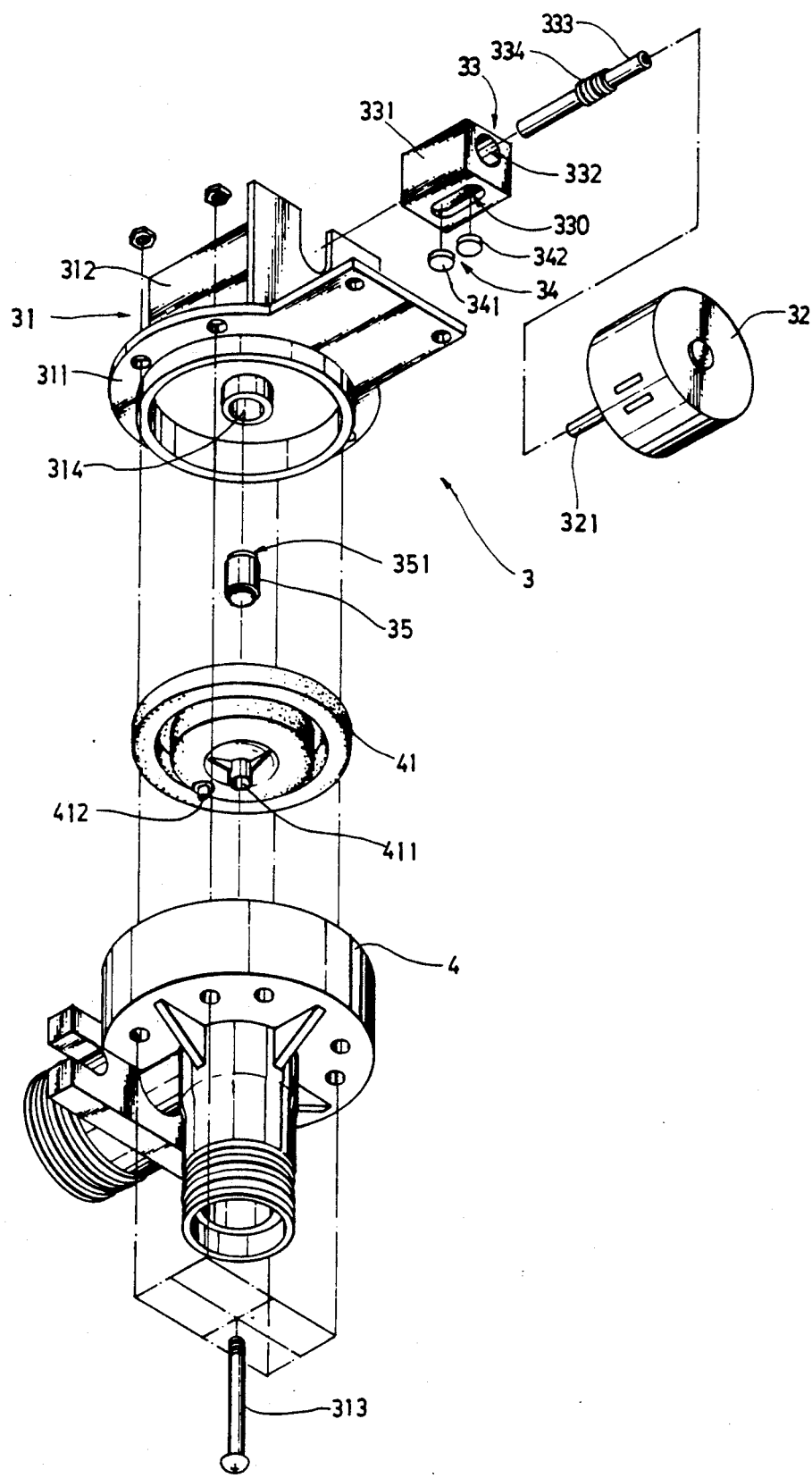
FIG. 3 is an exploded biew of a first embodiment of motor-controlled magnetic valve according to the present invention.

Referring to FIG. 3, a valve in accordance with the present invention is generally comprised of an actuating mechanism 3 mounted on a valve seat 4 to alternatively move a valve flap 41 back and forth. The actuating mechanism 3 is comprised of base 31, a reversible motor 32, a speed reducing gear 33, a set of magnets 34, and a plunger 35. The base 31 comprises a top chamber 312 upstanding from a base board 311. The base board 311 of the base 31 is secured to the valve seat 4 by screws 313, to hold the valve flap 41 inside the valve seat 4. A sleeve 314 is made on the base board 311 at the center for holding the plunger 35, which sleeve 314 has a top end closed by a thin wall 315 of the top chamber 312 (see FIGS. 4 and 5). The top chamber 312 is provided for holding the speed reducing gear 33 and the set of magnets 34. The speed reducing gear 3 is consisted of a slide block 331 and worm 333. The slide block 331 is made from iron so that the set of magnets 34 can be attached thereto by means of magnetic attraction. After having been put in the top chamber 312, the slide block 331 is bilaterally supported by two opposite side walls (not shown) to the top chamber 312 and controlled to alternatively move back and force inside the top chamber 312. The slide block 331 has an internally threaded center hole 332 through the longitudinal axis thereof for inserting the worm 333, and a bottom groove 330 on the bottom edge thereof for holding the set of magnets 34. After having been inserted in the center hole 332, one end of the worm 33 is coupled to the output shaft 321 of the reversible motor 32, with the external thread 334 thereof mushed with the internal thread (not shown) of the center hole 332. Therefore, rotating the reversible motor 32 in one direction causes the slide block 33 to move forwards; rotating the reversible motor 32 in an opposite direction causes the slide block 33 to move backwards. The set of magnets 34 includes two opposed permanent magnets 341, 342. Preferably, the permanent magnets 341, 342 are made from rare earth magnet. As indicated, the plunger 35 is inserted in the hole 314 on the base board 311 of the base 31. At the top of the plunger 35, there is attached a single-pole magnet 351 which is also made from rare earth magnet. During the reciprocating motion of the slide block 331 in the top chamber 312 above the wall 315 (which is conductive to magnetic force), the two opposed permanent magnets 341, 342 alternatively act upon the single-pole magnet 351 causing it to be alternatively attracted and repulsed, and therefore, the plunger 35 is alternatively moved away from the valve flap 41 or pushed down in pressing against the valve flap 41.

Figure 5:
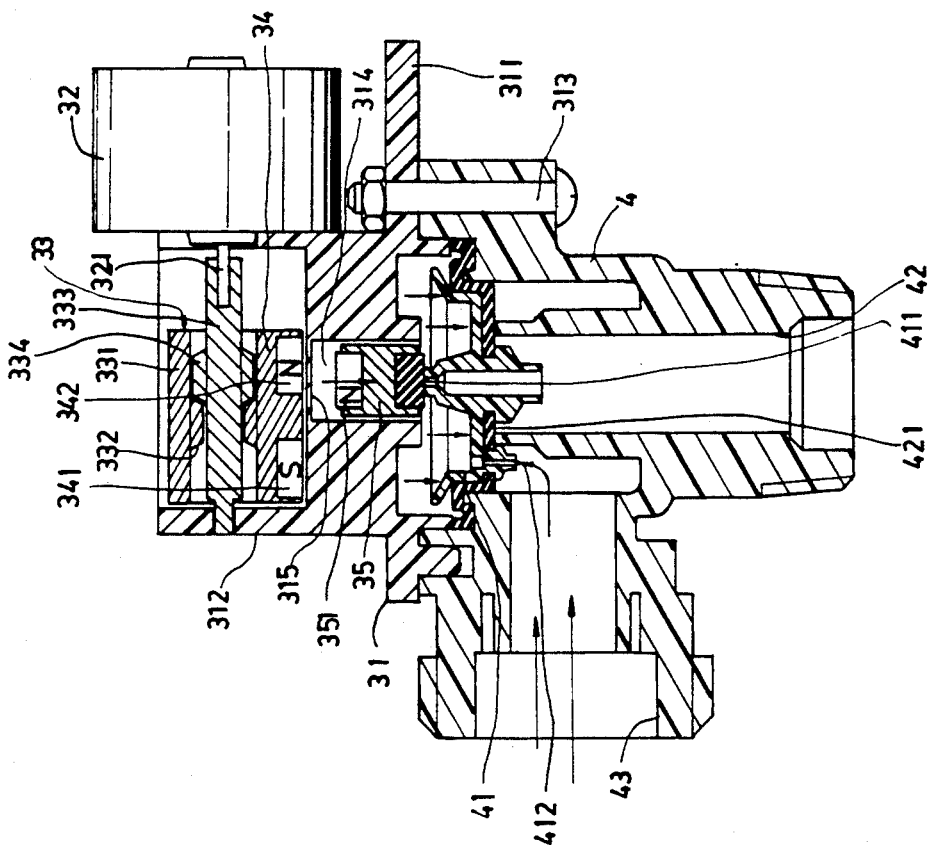
FIG. 5 is another sectional view of the motor-controlled magnetic valve of FIG. 4, showing the down stroke of the plunger in closing the discharging pipe.
Figure 4:
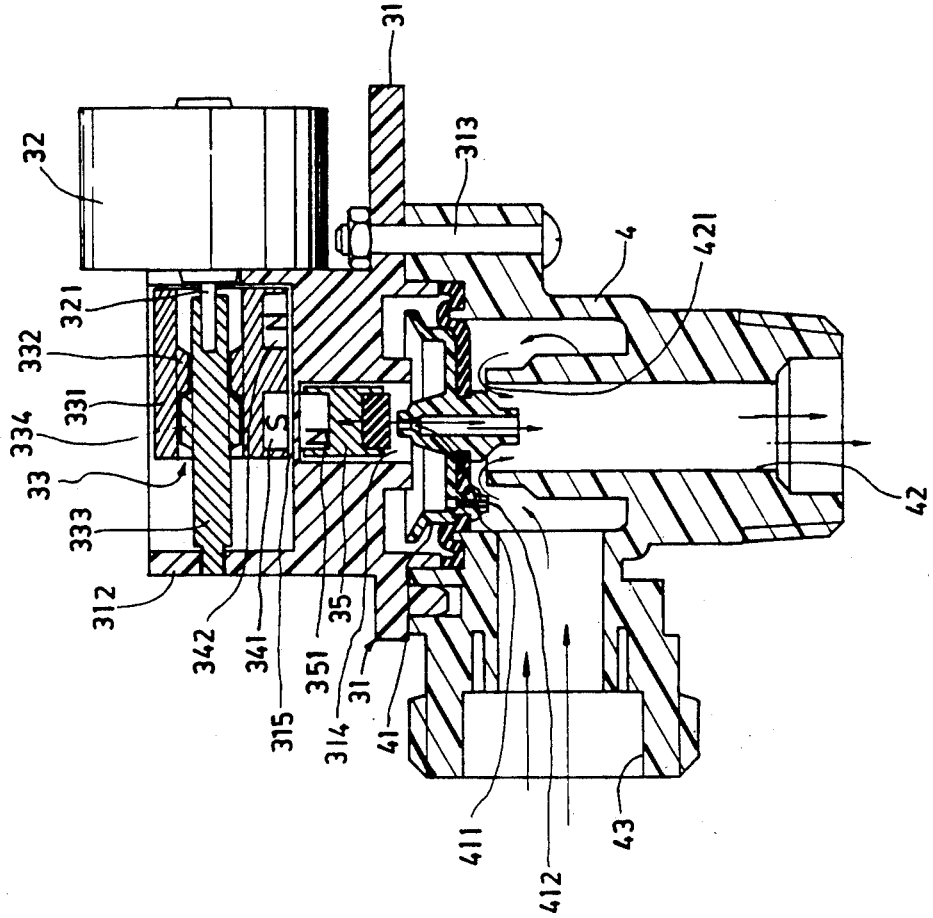
FIG. 4 is a sectional view of the motor-controlled magnetic valve of FIG. 3, showing the up stroke of the plunger in opening the discharging pipe.
Figure 6:
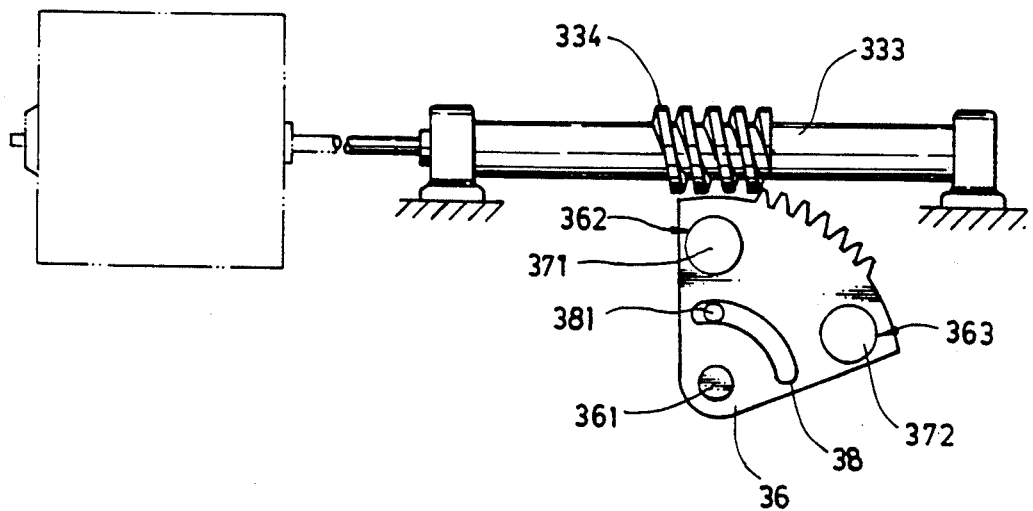
FIG. 6 illustrates an alternate form of the speed reducing gear according to the present invention, in which a sector gear is used to replace the worm.
Figure 8:
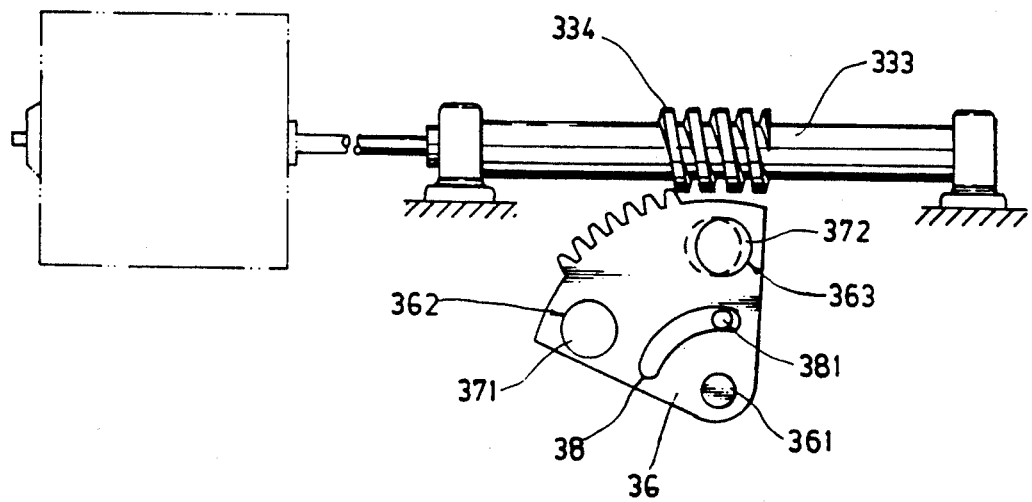
FIG. 8 illustrates that the sector gear of the speed reducing gear of FIG. 6 has been moved back.
Figure 7:
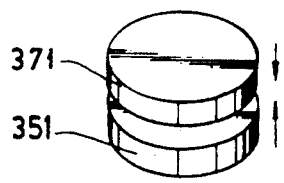
FIG. 7 illustrates the operation of the non-contact type of magnetic attraction of the magnets between the sector gear and the plunger.
Figure 9:
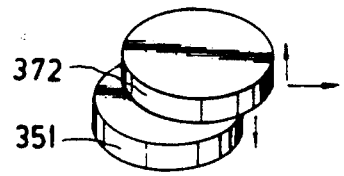
FIG. 9 illustrates the operation of the non-contact type of magnetic repulsion of the magnets between the sector gear and the plunger.

Referring to FIGS. 4 and 5, rotating the reversible motor 32 clockwise causes the slide block 331 to move forward (namely, toward the reversible motor 32) along the worm 33, and therefore, the first permanent magnet 341 is moved to a position in attracting the permanent magnet 351 on the plunger 35, causing the plunger 35 to lift from a water outlet hole 411 on the valve flap 41 (the valve flap 41 is made in a hollow structure having a water intake hole and a water outlet hole on a bottom edge thereof). Once the plunger 35 left the valve flap 41, the internal working fluid contained in the valve flap 41 is automatically guided through the water outlet hole 411 into a discharging pipe 42 (due to pressure difference). As soon as the internal working fluid of the valve flap 41 has been completely discharged into the discharging pipe 42, the internal pressure of the valve flap 41 is greatly reduced, and therefore, the working fluid in the water intake pipe 43 (which is connected to the valve seat 4 at one side) is induced to move the valve flap 41 away from the inlet orifice 421 of the discharging pipe 42 and then, flow into the discharging pipe 42. Thus, the valve is opened for passing the working fluid. On the contrary, rotating the reversible motor 32 counter-clockwise causes the slide block 331 to move backward namely, away from the reversible motor 32) along the worm 33, and therefore, the second permanent magnet 342 is moved to a position in repulsing the permanent magnet 351 on the plunger 35, causing the plunger 35 to press against the valve flap 41, and therefore, the water outlet hole 411 on the valve flap 41 becomes stopped. At the same time, the working liquid from water intake pipe 43 flows through a water intake hole 412 into the valve flap 41 causing it to be stretched in sealing up the inlet orifice 421 of the discharging pipe 42. Thus, the valve is sealed to stop the discharging pipe 42.

Referring to FIGS. 6, 7, 8 and 9 and seeing FIGS. 4 and 5 again, a sector gear 36 is supported on a sector shaft 361 and disposed in mesh with the external thread 334 of the worm 333 to replace the slide block 331. The sector gear 36 has two magnet holders 362, 363 for holding two opposite permanent magnets, namely, a positive pole permanent magnet 371 and a negative pole permanent magnet 372 at two opposite locations adjacent to the toothed peripheral edge thereof, and a curved groove 38 between the permanent magnets 371, 273 and the sector shaft 361 for inserting a stop pin 381, which controls the moving stroke of the sector gear 36. The magnet holders 362, 363 made be formed on a plastic material attached to the sector gear 36 through a metal sheet. If the sector gear 36 is made from a metal material, the magnet holders 363, 363 can be directly mounted thereon. When the motor 32 is rotated in one direction, the worm 333 is simultaneously rotated to move the sector gear 36 permitting the positive pole permanent magnet 371 to attract the permanent magnet 351 on the plunger 35, and therefore, the valve flap 41 will be pushed by the working liquid to move away from the inlet orifice 421 of the discharging pipe 42, causing the valve to open. When the motor 32 is rotated in on opposite direction, the worm 333 is simultaneously rotated to move the sector gear 36 permitting the negative pole permanent magnet 372 to repulse the permanent magnet 351 on the plunger 35, and therefore, the valve flap 41 will be squeezed by the plunger 35 to block up the valve. By controlling the revolutions of the worm 333 in either direction, the range of the reciprocating movement of the sector gear 36 can be predetermined. In an alternate way, the reciprocating movement of the sector gear 36 may be controlled by the stop pin 381. When the sector gear 36 has been moved in either direction with either end of the curved groove 38 stopped by the stop pin 381, the reversible motor 32 is caused to change its revolving direction. Further, because of the effect of the magnetic attraction and repulsion force between the permanent magnet 351 on the plunger 35 and the permanent magnet 371 (341) or 372 (342), the inertia force from the reversible motor 32 can be surpassed, and therefore, the sector gear 36 (or the slide block 331) can be firmly maintained in mesh with the worm 333 when the reversible motor 32 is stopped.

Figure 10:
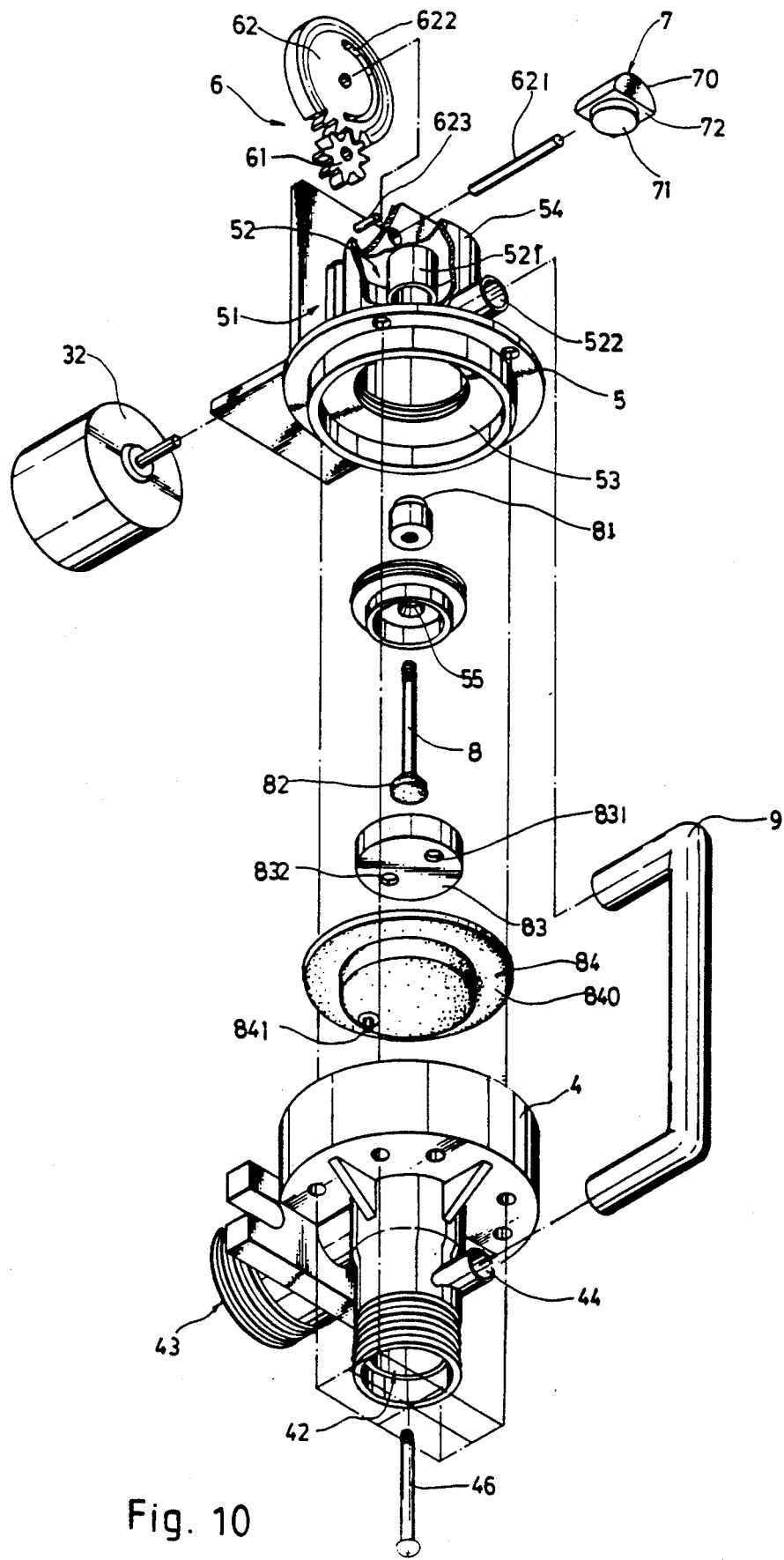
FIG. 10 is an exploded view of a second embodiment of motor-controlled magnetic valve according to the present invention.

Referring to FIG. 10, therein illustrated is a second embodiment of the present invention. In this embodiment, the actuating mechanism of the valve is comprised of a motor 32, a speed reducing gear 6, a metal swinging block 7, an external magnet 71, an internal magnet 81, a plunger 8 and an internal division plate 83. These parts are respectively secured to a base 5. The base 5 which is mounted on a valve seat 4 at the top to hold a valve flap 84 therein, is comprised of a gear chamber 51 for holding a small gear 61 and a larger gear 62 of the speed reducing gear 6, an upper water trough 52, and a lower chamber 53. The small gear 61 is driven by the reversible motor 32 to rotate the larger gear 62. The larger gear 62 is connected to the swinging block 7 by a shaft 621, and has a curved groove 622 on the face thereof into which a stop pin 623 from a side wall of the base 5 is inserted. By means of the arrangement of the stop pin 623, the larger gear 62 is confined to alternatively rotate within a fixed angle defined by the curved groove 622. Therefore, the swinging block 7 can be alternatively rotated within a fixed angle. The swinging block 7 is made from a semi-circular metal block having a flat bottom edge 72 for attaching the external magnet 71 permitting the external magnet 71 to be disposed above the wall 54 of the upper water trough 52. Inside the upper water trough 52, there is provided a center tube 521 extending downwards from the top edge of the wall 54 for guiding the plunger 8. The internal magnet 81 is attached to the plunger 8 at the top edge thereof through a screw joint. The plunger 8 has an enlarged plunger head 82 at the bottom, which plunger head 82 is preferably made from a silicon rubber. The internal and external magnets 81, 71 have the same polarity, and therefore, they will repulse each other. Therefore, the plunger 8 will be forced to move downwards when the external magnet 71 turned to a bottom position, or carried upwards by the internal magnet 81 when the external magnet 71 turned to a top position (namely, when the circular peripheral surface 70 of the swinging block 7 turned to a bottom position). The upper water trough 52 is disposed above the lower chamber 53 with a water outlet hole 55 formed therebetween for communication, which water outlet hole 55 is longitudinally aligned with the center tube 521. The upper water trough 52 further comprises a water outlet pipe 522 connected to a branch tube 44 on a discharging pipe 42 of the valve seat 4 by a hose 9. The internal division plate 83 is connected between the upper water trough 52 and the lower chamber 53 below the water outlet hole 55 (see FIGS. 11, 12), having a center recess 833 and two water passage holes 831, 832. The total sectional area of the two water passage holes 831, 832 is slighter bigger than the sectional area of the water inlet hole 841 on the valve flap 84. This arrangement reduces the resisting force against the a plunger head 82 of the plunger 8 during the down stroke of the plunger 8. The valve flap 84 is made from rubber in a hollow structure having a flush type flat flange 840 around the peripheral top edge thereof. The lower chamber 53 in the base 5 is defined between the valve flap 84 and the internal division plate 83. As indicated, the water outlet pipe 522 of the upper water trough 52 is connected to the branch tube 44 of the discharging pipe 42 of the valve seat 4 by the hose 9, the upper water trough 52 and the discharging pipe 42 form into a water discharging and pressure dropping piping system.

Figure 11:
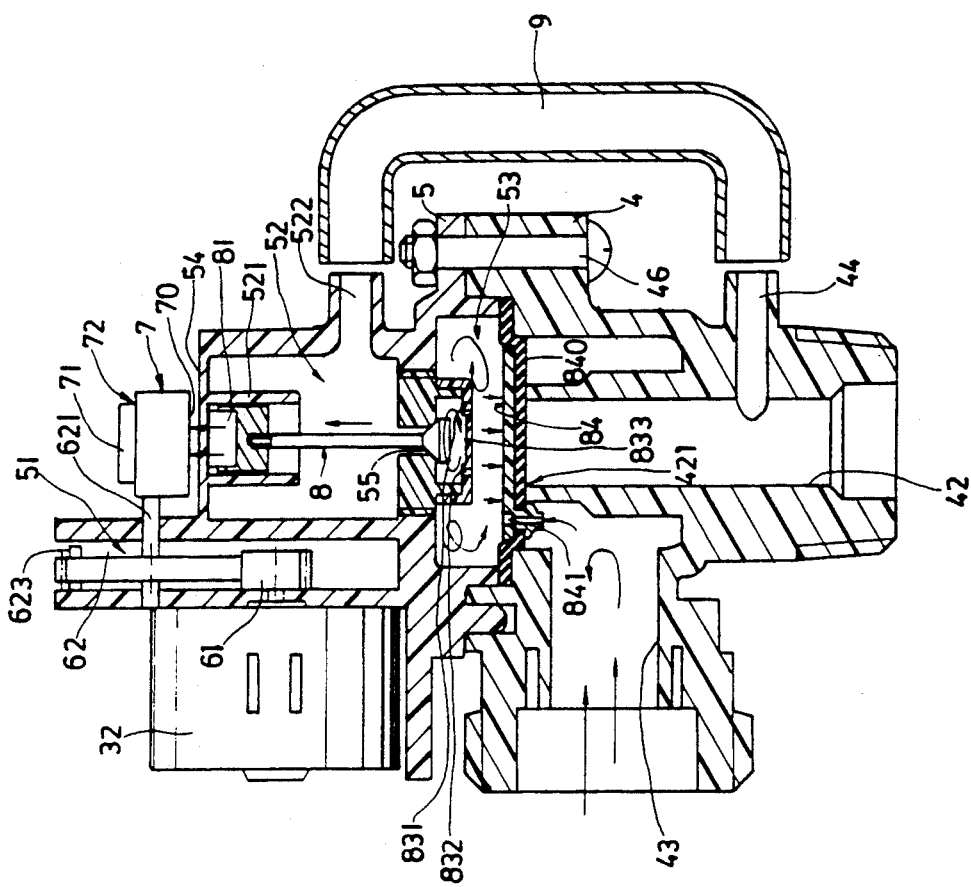
FIG. 11 is a sectional view of the motor-controlled magnetic valve of FIG. 10, showing the up stroke of the plunger in opening the discharging pipe.
Figure 12:
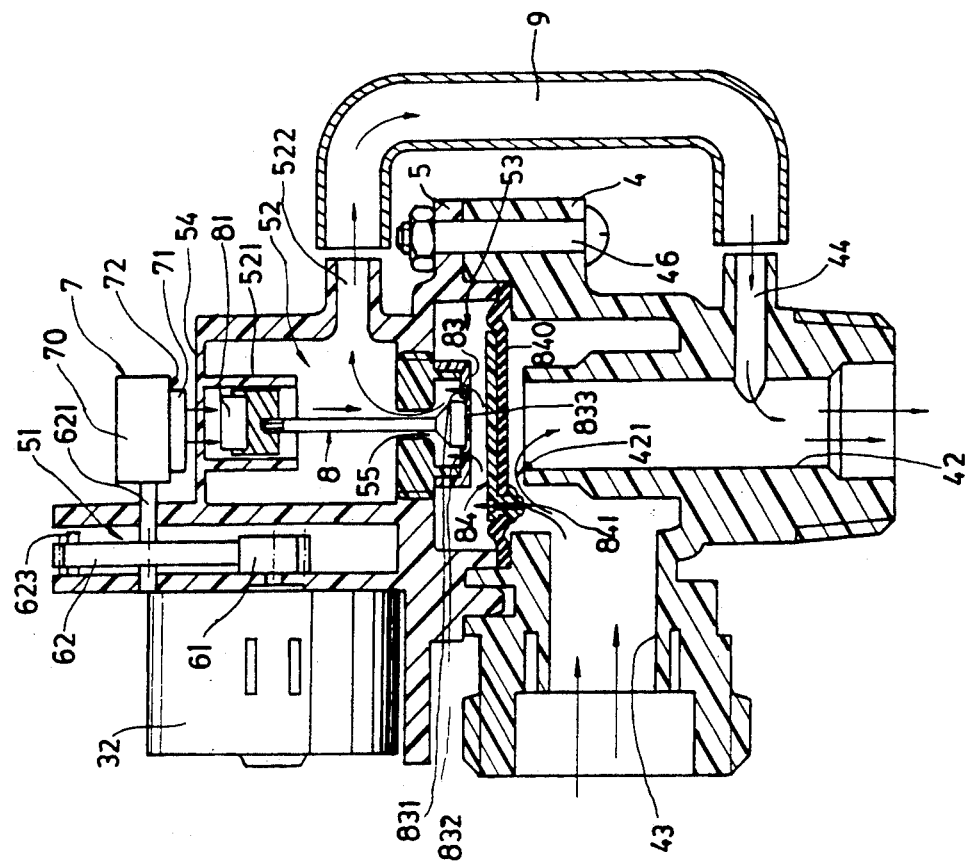
FIG. 12 is another sectional view of the motor-controlled magnetic valve of FIG. 10, showing the down stroke of the plunger in closing the discharging pipe.

Referring to FIGS. 11 and 12, the operation of the second embodiment of the present invention is outlined hereinafter. When a high pressure fluid is guided from a water intake pipe 43 into the valve seat 4, it immediately flows through the water inlet hole 841 into the lower chamber 53. At the same time, let the internal magnet 81 to be attached to the top edge of the wall 54, by means of comtrolling the operation of the reversible motor 32 in rotating the swinging block 7 in one direction permitting the circular peripheral surface 70 of the swinging block 7 to be turned to the bottom position. Therefore the water outlet hole 55 becomes stopped by the plunger head 82 of the plunger 8, causing the valve flap 84 to be squeezed by the pressure of the fluid to tightly seal the top orifice 421 of the discharging pipe 42. thus, the valve is in a closed mode to stop the fluid from discharging through the discharging pipe 42. On the contrary, turning the reversible motor 32 in a reverse direction to move the external magnet 71 to the bottom position causes the plunger 8 to be moved downwards, by means of the effect of magnetic repulsion between the internal and external magnets 81, 71, and therefore, the plunger head 82 is released from the water outlet hole 55. When the water outlet hole 55 is opened, the fluid in the lower chamber 53 is allowed to flow through the water passage holes 831, 832 into the upper water trough 52 (by means of the effect of pressure difference), and therefore, the valve flap 84 is moved away from the top orifice 421 of the discharging pipe 42, by the continuous intake fluid coming from the water intake pipe 43, for discharging of the fluid through the discharging pipe 42. At the same time, the fluid into the upper water trough 52 is simultaneously guided to the discharging pipe 42 through the hose 9 for discharging. Therefore, the valve flap 84 is controlled to close or open the discharging pipe 42 by means of the reciprocating movement of the plunger 8 in closing or opening the water outlet hole 55, and the reciprocating motion of the plunger is controlled by means of magnetic attraction or repulsion.

I claim:

1. A low power, motor-controlled magnetic valve comprising a plunger, a valve flap, an internal magnet connected to said plunger, and actuating mechanism, and a speed reducing gear means controlled by said actuating mechanism and including an external magnet set for moving said external magnetic set between first and second positions, said external magnet set being arranged in said first position for attracting said internal magnet causing said plunger to separate from said valve flap and opening a discharging pipe, and said external magnet being arranged in said second position for repulsing said internal magnet causing said plunger to press against said valve flap and closing said discharging pipe.

2. The valve according to claim 1, wherein said actuating mechanism comprises a reversible motor.

3. The valve according to claim 2, wherein said speed reducing gear means comprises a worm and a slide block, said slide block having an internally threaded center hole through a longitudinal axis thereof for engaging said worm, said worm having one end coupled to said reversible motor.

4. The valve according to claim 3, wherein rotating said reversible motor in one direction causes said slide block to move forwards permitting said external magnet set to be moved into said first position; rotating said reversible motor in a reverse direction causes said slide block to move backwards permitting said external magnet set to be moved into said second position.

5. The valve according to claim 2, wherein said speed reducing gear means comprises a worm and a sector gear, said worm and said sector gear being in mesh with each other, said worm having one end coupled to said reversible motor.

6. The valve according to claim 1, wherein rotating said reversible motor in one direction causes said sector gear to move forwards permitting said external magnet set to be moved into said first position; rotating said reversible motor in a reverse direction causes said sector gear to move backwards permitting said external magnet set to be moved into said second position.

7. The valve according to claim 2, wherein said speed reducing gear means comprises a small gear and a larger gear disposed in mesh with each other, said small gear being controlled by said reversible motor to rotate larger gear permitting said external magnet set to be moved into said first position and said second position.

8. The valve according to claim 3 wherein said internal magnet set comprises a first permanent magnet attached to said plunger at a top edge thereof; said external magnet set comprises a second permanent magnet and a third permanent magnet respectively attached to said slide block at a bottom edge thereof at two opposite locations, said second permanent magnet being moved to attract said first permanent magnet upon the forward movement of said slide block, said third permanent magnet being moved to repulse said first permanent magnet upon the backward movement of said slide block.

9. The valve according to claim 5, wherein said internal magnet set comprises a first permanent magnet attached to said plunger at a top edge thereof; said external magnet set comprises a second permanent magnet and a third permanent magnet respectively attached to said sector gear at two opposite locations, said second permanent magnet being to attract said first permanent magnet upon the forward movement of said sector gear, said third permanent magnet being to repulse said first permanent magnet upon the backward movement of said slide block.

10. The valve according to claim 7 wherein said internal magnet comprises a first permanent magnet; said external magnet set comprises a swinging block coupled to said small gear by a shaft, said swinging block comprising a metal body having a second permanent magnet attached to a bottom edge thereof, said metal body being moved to a bottom position in attracting said first permanent magnet by rotating said reversible motor in one direction, said second permanent magnet being moved to said bottom position in repulsing said first permanent magnet by rotating said reversible motor in a reverse direction.

11. The valve according to claim 6, wherein said sector gear is driven to rotate forwards or backwards by said worm and controlled by a stop pin to move within a fixed angle, said stop pin being inserted in a curved, elongated slot on said sector gear, said curved, elongated slot having two opposite ends alternatively stopped against said stop pin when said external magnet set moved into said first or second position.

12. The valve according to claim 7, wherein said larger gear is driven to rotate forwards or backwards by said small gear and controlled by a stop pin to move within a fixed angle, said stop pin being inserted in a curved, elongated slot on said larger gear, said curved, elongated slot having one two opposite ends alternatively stopped against said stop pin when said external magnet set moved into said first or second position.

13. The valve according to claim 1, wherein said external magnet set and said internal magnet set are separated by a magnetic force permeable wall.

14. The valve according to claim 1, wherein actuating mechanism comprised a reversible motor mounted on a base, said base comprising an upper water trough, a lower chamber connected to said upper water trough through a water outlet hole, through which said plunger is inserted, and an internal division plate formed therebetween said lower chamber and said upper water trough, said internal division plate having a center recess for stopping said plunger from moving downwards, and two water passage holes for passing a flow of fluid from a water inlet hole on said valve flap into said upper water trough upon an up stroke of said plunger, permitting water pressure at two opposite sides of said valve flap to be equilibrated.

* * * * *